(12) United States Patent
Wright et al.

(10) Patent No.: US 6,517,910 B2
(45) Date of Patent: Feb. 11, 2003

(54) FREE RADICAL POLYMERIZATION METHOD

(75) Inventors: Robin E. Wright, Inver Grove Heights, MN (US); George F. Vesley, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/777,995

(22) Filed: Feb. 6, 2001

(65) Prior Publication Data

US 2001/0031798 A1 Oct. 18, 2001

Related U.S. Application Data

(62) Division of application No. 09/096,004, filed on Jun. 11, 1998, now Pat. No. 6,224,949.

(51) Int. Cl.$^7$ .............................. C08F 2/48; C08F 2/46
(52) U.S. Cl. ...................... 427/508; 427/510; 427/256; 522/2; 522/46; 522/39; 522/148; 522/149; 522/150; 522/152; 522/153; 522/154; 522/155; 522/156; 522/157; 522/158; 522/159; 522/160; 522/161; 522/162; 264/494; 264/495
(58) Field of Search .............................. 522/1, 2, 6, 46, 522/39, 148–149, 150–162; 264/494, 495; 427/508, 510, 256

(56) References Cited

U.S. PATENT DOCUMENTS

| | | | |
|---|---|---|---|
| 4,181,752 A | 1/1980 | Martens et al. | 427/54.1 |
| 4,262,072 A | 4/1981 | Wendling et al. | 430/14 |
| 4,329,384 A | 5/1982 | Vesley et al. | 428/40 |
| 4,330,590 A | 5/1982 | Vesley | 428/336 |
| 4,379,201 A | 4/1983 | Heilmann et al. | 428/345 |
| 4,737,559 A | 4/1988 | Kellen et al. | 526/291 |
| 4,748,043 A | 5/1988 | Seaver et al. | 427/30 |
| 4,885,332 A | 12/1989 | Bilkadi | 524/714 |
| 5,073,611 A | 12/1991 | Rehmer et al. | 526/208 |
| 5,091,483 A | 2/1992 | Mazurek et al. | 525/477 |
| 5,128,386 A | 7/1992 | Rehmer et al. | 522/35 |
| 5,202,483 A | 4/1993 | Rehmer et al. | 564/207 |
| 5,248,805 A | 9/1993 | Boettcher et al. | 558/270 |
| 5,264,533 A | 11/1993 | Rehmer et al. | 526/301 |
| 5,294,688 A | 3/1994 | Rehmer et al. | 526/260 |
| 5,326,598 A | 7/1994 | Seaver et al. | 427/473 |
| 5,389,699 A | 2/1995 | Rehmer et al. | 522/35 |
| 5,504,391 A | 4/1996 | Turner et al. | 313/570 |
| 5,543,231 A | 8/1996 | Kidon et al. | 428/417 |
| 5,562,992 A | 10/1996 | Kidon et al. | 428/447 |
| 5,686,793 A | 11/1997 | Turner et al. | |
| 5,891,530 A | 4/1999 | Wright | 427/515 |

FOREIGN PATENT DOCUMENTS

| | | |
|---|---|---|
| WO | WO 94/14853 | 7/1994 |
| WO | WO 94/20583 | 9/1994 |
| WO | WO 96/00740 | 11/1996 |
| WO | WO 97/39837 | 10/1997 |
| WO | WO 97/40090 | 10/1997 |
| WO | WO 98/37105 | 8/1998 |

OTHER PUBLICATIONS

Kitamura et al., *Applied Surface Science*, 79/80 (1994), 507–513;
Kogelschatz et al., *ABB Review*, 3 (1991), 21–28.
Kogelschatz et al., *Applied Surface Science*, 54 (1992), 410–423.
Zhang et al., *Journal of Adhesion Science and Technology*, 8(10) (1994), 1179–1210.
A.F. Jacobine and S.T. Nakos, "Photopolymerizable Silicone Monomers, Oligomers, and Resins," *Radiation Curing Science and Technology*, (1992) Plenum: New York, 200–214.
R. Nagarajam et al., *Radtech Report*, Jul./Aug. 1997, 26–30.
Patent Abstracts of Japan, vol. 016, No. 544, JP 04202865, Jul. 23, 1992.
Yamashita, H., et al, Photopolymerization of UV–curable Coatings, Chemical Abstracts, vol. 112, No. 10, 1990.
Allen, Norman S. et al., Photochemistry and photopolymerization activities of novel phenylthiobenzophenone and diphenylthiophene photointiators, Polymer, vol. 39, No. 4, Feb. 1, 1998, pp. 903–909.

*Primary Examiner*—James J. Seidleck
*Assistant Examiner*—Sanza L. McClendon
(74) *Attorney, Agent, or Firm*—Melanie Gover

(57) ABSTRACT

In one aspect the invention provides an energy efficient polymerization method comprising irradiating a polymerizable composition and a photoinitiator with a source of essentially monochromatic radiation where the photoinitiator and the wavelength of the radiation source are selected such that the extinction coefficient of the photoinitiator at the peak wavelength of the source is greater than about 1000 $M^{-1}$ $cm^{-1}$ and such that the photoinitiator absorbs at least two percent of the actinic radiation incident on the coating.

In another aspect the invention provides energy efficient methods of polymerizing polymerizable compositions and crosslinking crosslinkable compositions by irradiating the respective compositions with a low power source of essentially monochromatic radiation. The low power energy sources have an input power of less than about 10 W/cm.

Articles made from the above methods, including polymer films having release coatings, adhesive coatings, hard coatings and the like thereon, also are provided.

12 Claims, No Drawings

FREE RADICAL POLYMERIZATION METHOD

This is a divisional of application Ser. No. 09/096.004 filed Jun. 11 1998 now U.S. Pat. No. 6,224,949.

FIELD OF THE INVENTION

This invention relates generally to a process for polymerizing a radiation polymerizable composition and more particularly to a polymerization process using a monochromatic radiation source. An efficient method for crosslinking a radiation crosslinkable polymeric coating also is described.

BACKGROUND OF THE INVENTION

Radiation-induced free radical polymerization of ethylenically unsaturated monomers is known with both batch and continuous polymerizations having been achieved by this technique. While a desire to build high molecular weight product tends to make batch polymerization methods relatively slow, it generally is desirable to achieve final product in a much shorter time when polymerizing coatings applied to a substrate. Radiation-induced free radical polymerization of coatings currently is accomplished by exposing a polymerizable coating to the output of a high intensity source of radiation, typically a medium pressure mercury lamp or a doped mercury lamp. Photoinitiator(s) present in the coatings absorb certain regions of the spectral output of the lamp generating free radicals and initiating the polymerization process. There is, however, a need to perform radiation-induced free radical polymerization of coatings with greater energy efficiency and with short residence times, particularly on substrates that are adversely affected by heat generated from the radiation sources. Similar considerations are associated with crosslinking of polymeric coatings containing radiation activatable crosslinking agents.

The radiation-induced free radical polymerization of coatings comprising ethylenically unsaturated monomers or oligomers is accomplished by exposing a coating to the spectral output from a high intensity radiation source comprising one or more bulbs that typically have an input power per bulb of about 40 W/cm or greater. These same sources commonly are used for crosslinking polymeric coatings containing radiation activatable crosslinking agents. When a source contains mercury at these power levels, its spectral output occurs over a large range of wavelengths, including the ultraviolet, the visible, and the infrared region of the electromagnetic spectrum. The presence of a radiation activatable species (a photoinitiator for a polymerizable coating or a photocrosslinker for a polymeric coating) generally is required for these systems to work. Photoinitiators and photocrosslinking agents do not, in general, absorb appreciably in either the visible or the infrared regions of the spectrum and therefore only a small percentage of the total spectral output from these sources is used to induce polymerization of a polymerizable coating or to crosslink a polymeric coating. Further, differential absorption by the radiation activatable species within a coating causes large cure gradients to form between its top and bottom surfaces. Infrared radiation and radiant heat often also are undesirable themselves as their presence causes low molecular weight species to volatilize from coatings, distorts heat sensitive backings, and requires shutters and/or safety interlocks to minimize the potential for fire.

Processes that employ energy more efficiently recently have been introduced. Stark and Wright in WO 97/39837 describe use of a monochromatic light source, preferably a xenon chloride excimer lamp having a peak wavelength of 308 nm, to crosslink a hot melt coatable adhesive composition. In these compositions, the absorptivity of the photoactivatable crosslinking agent at the wavelength of the excimer source is low allowing for the penetration of the light through the entire coating thickness causing a minimal cure gradient to form.

Wright in WO 97/40090 describes use of a monochromatic light source, preferably a krypton chloride excimer lamp having a peak wavelength of 222 nm, to cure free radically polymerizable coatings without the necessity of a photoinitiator. When photoinitiators are present, the light is not used efficiently due to competing absorption by the polymerizable monomers and oligomers.

Nohr and MacDonald in WO 96/00740 describe a general method for generating a reactive species by providing a polymolecular photoreactor comprising a wavelength specific sensitizer in association with a reactive species generating photoinitiator and irradiating the sensitizer with actinic radiation. In one embodiment, an excimer lamp is employed as the radiation source.

There remains a need to perform radiation-induced polymerization of free radically polymerizable coatings containing a photoinitiator and a need to perform radiation induced crosslinking of polymeric coatings containing a photoactivatable crosslinking agent with greater energy efficiency and with shorter exposure times.

SUMMARY OF THE INVENTION

Briefly, in one aspect, the present invention provides a polymerization method comprising the steps of:
 (a) providing a substrate coated on at least a portion thereof with a radiation polymerizable composition comprising: (i) an ethylenically unsaturated free radically polymerizable monomer oligomer or blend thereof, and (ii) a free radical photoinitiator;
 (b) providing a source of essentially monochromatic radiation having a wavelength effective to activate said photoinitiator; and
 (c) exposing the radiation polymerizable composition to the radiation emitted by the radiation source for a time sufficient to polymerize the composition;
  wherein the photoinitiator and the wavelength of the radiation source are selected such that the extinction coefficient of the photoinitiator at the peak wavelength of the source is greater than about 1000 M$^{-1}$ cm$^{-1}$ and wherein the photoinitiator absorbs at least two percent of the actinic radiation emitted by the source incident on the coating.

In another aspect, this invention provides a polymerization method comprising the steps of:
 (a) providing a moving substrate coated on at least a portion thereof with a radiation polymerizable composition comprising: (i) an ethylenically unsaturated free radically polymerizable monomer, oligomer, or blend thereof, and (ii) a free radical photoinitiator;
 (b) providing a source of essentially monochromatic radiation comprising one or more lamps wherein each lamp has an input power of less than about 10 W/cm and a wavelength effective to activate said photoinitiator; and
 (c) exposing the radiation polymerizable composition to the radiation emitted by the radiation source for a time sufficient to polymerize the composition.

In a further aspect, this invention provides a method for crosslinking a polymeric coating comprising the steps of:

(a) providing a moving substrate coated on at least a portion thereof with a crosslinkable composition comprising: (i) a radiation crosslinkable polymer containing abstractable hydrogen atoms, and (ii) a radiation activatable crosslinking agent;

(b) providing a source of essentially monochromatic radiation comprising one or more lamps wherein each lamp has an input power of less than about 10 W/cm and a wavelength sufficient to activate the crosslinking agent and to crosslink the polymer; and (c) exposing the radiation crosslinkable composition to the radiation emitted by the monochromatic source for a time sufficient to crosslink the polymer.

Articles made from the above methods, including polymer films having release coatings, adhesive coatings, hard coatings and the like thereon, also are provided. The methods provided by the invention allow for the preparation of polymer coatings by appropriate selection of the wavelength and/or power of the monochromatic radiation source and the photoinitiator or photocrosslinker. Such methods allow for precise manipulation of the cure rate and cure depth such that a rapid and efficient cure may be used. Highly energy efficient radiation-induced polymerization and crosslinking methods also are provided. DETAILED DESCRIPTION OF PREFERRED EMBODIMENTS In accordance with one aspect of the present invention, a polymerizable composition containing an ethylenically unsaturated free radically polymerizable monomer, oligomer, or blend thereof and an appropriately selected photoinitiator are exposed to a monochromatic light source to produce a coating. In a second aspect, a radiation crosslinkable composition of a polymer having abstractable hydrogen atoms and an appropriately selected photoactivatable crosslinking agent is exposed to a monochromatic light source to produce a crosslinked polymeric coating. The type of polymeric coating produced by a method of the invention depends on the materials contained in the composition. The polymeric coatings so produced may include release coatings, pressure sensitive adhesives, hard coats, primers for adhesives, and the like.

Monochromatic light sources are those having essentially eighty, preferably ninety, and more preferably ninety five percent or more of their total actinic readiation output within a narrow spectral range defined by no more than about a 25 nm, preferably 15 nm, and more preferably 10 nm, deviation from the peak wavelength provided by the source. In addition, preferred monochromatic light sources radiate little or no heat. Examples of monochromatic light sources include both pulsed and continuous sources in which the output is coherent such as a xenon chloride excimer laser and incoherent such as a xenon chloride excimer lamp. Specific wavelengths emitted by the different excimer sources depend upon the chemical nature of the excimer species. Excimer lamps are advantageous over excimer lasers because the light output occurs over a relatively large area and does not require spreading to be effective. A preferred monochromatic light source is a xenon chloride excimer lamp driven at about 50 W/cm and having an output centered at 308 nm with a bandwidth of about 10 nm (Heraeus Noblelight, Hanau, Germany). A 240 W/cm xenon chloride excimer lamp (Fusion UV Curing Systems, Gaithersburg, Md.) also provides a peak wavelength of 308 nm but since its emitted energy is distributed over a much broader spectral range it is not considered a monochromatic light source for the purposes of the invention. While such a higher powered excimer source is able to increase the energy efficiency of the cure process when compared to broadband mercury and doped mercury sources, it has a significant heat output associated with it and is less efficient than the monochromatic light sources of the present invention.

Monochromatic radiation sources providing output in the wavelength range from about 170 to about 600 nm are useful in the present invention. Inherent absorption from organic monomers, oligomers, blends, or polymers present, however, provide practical limits to the useful wavelength range of a particular source for a given composition. As a result, a preferred wavelength range is from about 240 nm to about 600 nm, most preferably from about 240 nm to about 400 nm.

Preferred excimer lamps have been described in various patent publications including published patent application WO 94/14853, and German Patent Application No. DE 4,302,555 A1, as well as several literature references such as Kitamura et al., *Applied Surface Science*, 79/80 (1994), 507–513; Kogelschatz et al., *ABB Review*, 3 (1991), 21–28; Kogelschatz, *Applied Surface Science*, 54 (1992), 410–423; and Zhang et al., *Journal of Adhesion Science and Technology*, 8(10) (1994), 1179–1210.

Another preferred source of monochromatic radiation is a low pressure mercury arc lamp that has an emission band centered at 254 nm. These lamps, often referred to as germicidal lamps, operate at much lower power than the excimer lamps described above, typically requiring only about 1 W/cm. Low pressure mercury arc lamps are used extensively in air and water purification because of their efficacy towards bacteria, mold, yeast, and viruses.

The particular monochromatic light source employed may be utilized in either a focussed or unfocussed mode. Where more than one lamp is used, spacing between the lamps may be adjusted to provide an optimum average irradiance level. Alternatively, a given lamp or plurality of lamps may have variable input power such as with a dimmable lamp. Filters also may be used to diminish the intensity of a given monochromatic light source if deemed advantageous to do so. Similarly, a non-uniform irradiance profile may be used in the case where multiple lamps are present. The monochromatic lamps of the invention may be mounted directly over the coating to be cured separated only by an air or nitrogen gap or, preferably, may be isolated from the coating by some transparent or semitransparent barrier layer such as a transparent polymer film or quartz window. In those cases where a coating is applied to a substrate that is transparent or semitransparent at the wavelength of the monochromatic source, irradiation of the coating may occur through the substrate. Examples of transparentor semitransparent substrates include polyester, biaxially oriented polypropylene, and polyethylene. Polyolefin films are of particular utility because of their high UV transmission and therefore are preferred.

Ethylenically unsaturated free radically polymerized materials may be monomers, oligomers, or blends thereof. Useful classes include, for example, vinyl-functional monomers that are monofunctional, difunctional or polyfunctional; free radically polymerizable macromers; and ethylenically unsaturated free-radically polymerizable polysiloxanes. Generally, the most useful ethylenically unsaturated free radically polymerizable monomers employed in this invention are vinyl-functional starting materials. Such vinyl starting materials include but are not limited to acrylic acid and its esters, methacrylic acid and its esters, vinyl-substituted aromatics, vinyl-substituted heterocyclics, vinyl esters, vinyl chloride, acrylonitrile, methacrylonitrile, acrylamide and derivatives thereof, methacrylamide and derivatives thereof, and other vinyl monomers polymerizable by free-radical means.

Preferably, the ethylenically unsaturated free radically polymerizable monomers have the following general structure:

$$[A]\overline{\overline{m}}\!-\!B \qquad (I)$$

where the depicted A represents an ethylenically unsaturated free radically reactive functional group, m is a number of at least one, and B represents an m valent radical which is largely free of aromatic, chloro- and other moieties or substituents that significantly absorb radiation at the wavelength of the chosen monochromatic light source. Absorption of radiation by such moieties or substituents can interfere with the activation of the photoinitiator and thus prevent the free radical formation required to initiate and propagate the desired polymerization. These monomers may be mono, di, or polyfunctional (i.e., having one, two, or three or more free radically reactive functional A groups, respectively) and have one or more functional groups preferably selected from acrylate, methacrylate, and vinyl ester functionalities.

Monofunctional acrylate and methacrylate monomers useful in the method of invention include compositions of Formula I where A represents $H_2C=CR^1COO-$ (where $R^1$ is a hydrogen atom or a methyl group), m=1, and B represents a monovalent straight chain alkyl, branched alkyl or cycloalkyl group having from about 1 to about 24 carbon atoms. Examples of such monofunctional acrylate and methacrylate monomers include but are not limited to methyl acrylate, methyl methacrylate, isooctyl acrylate, 4-methyl-2-pentyl acrylate, 2-methylbutyl acrylate, isoamyl acrylate, sec-butyl acrylate, n-butyl acrylate, tert-butyl acrylate, isobomyl acrylate, butyl methacrylate, ethyl acrylate, dodecyl acrylate, octadecyl acrylate, cyclohexyl acrylate and mixtures thereof. Preferred acrylate monomers include those selected from the group consisting of isooctyl acrylate, isononyl acrylate, isoamyl acrylate, isodecyl acrylate, 2-ethylhexyl acrylate, isobomyl acrylate, n-butyl acrylate, sec-butyl acrylate, and mixtures thereof.

Vinyl ester monomers suitable for use in the process of the invention include compositions of Formula I where A represents $H_2C=CHOC(O)-$, m=1, and B represents a monovalent straight chain or branched alkyl group having from about 1 to about 24 atoms. Such vinyl ester monomers include but are not limited to vinyl acetate, vinyl 2-ethylhexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 16 carbon atoms. Preferred vinyl ester monomers include vinyl acetate, vinyl laurate, vinyl caprate, vinyl-2-ethylhexanoate, and mixtures thereof.

Monofunctional monomers which are readily copolymerizable with acrylate, methacrylate and vinyl ester monomers that are largely free of aromatic, chloro- and other moieties or substituents that significantly absorb radiation at the wavelength of the chosen monochromatic light source also may be employed in the compositions of the invention. Such monomers include but are not limited to acrylic acid, methacrylic acid, itaconic acid, crotonic acid, maleic acid, fumaric acid, sulfoethyl methacrylate, N-vinyl pyrrolidone, N-vinyl caprolactam, acrylamide, t-butyl acrylamide, dimethylamino ethyl acrylamide, N-octyl acrylamide, acrylonitrile, mixtures thereof, and the like. Preferred monomers include acrylic acid, N-vinyl pyrrolidone, and mixtures thereof.

Free radically copolymerizable macromonomers of Formula I, where A is $H_2C=CR^1COO-$ (where $R^1$ represents a hydrogen atom or a methyl group), m is 1, and B is a monovalent polymeric or oligomeric radical having a degree of polymerization greater than or equal to 2 that is largely free of aromatic, chloro- and other moieties or substituents that significantly absorb radiation at the wavelength of the chosen monochromatic light source also may be employed in the invention. Examples of such macromonomers include acrylate-terminated poly(methyl methacrylate), methacrylate-terminated poly(methyl methacrylate), acrylate-terminated poly(ethylene oxide), methacrylate-terminated poly(ethylene oxide), acrylate-terminated poly (ethylene glycol), methacrylate-terminated poly(ethylene glycol), methoxy poly(ethylene glycol)methacrylate, butoxy poly(ethylene glycol)methacrylate, and mixtures thereof. These functionalized materials are preferred because they are prepared easily using well known ionic polymerization techniques and are also highly effective in providing grafted oligomeric and polymeric segments along free radically polymerized acrylate polymer backbones.

Useful difunctional and polyfunctional acrylate and methacrylate free radically polymerizable monomers include ester derivatives of alkyl diols, triols, tetrols, etc. (e.g., 1,4-butanediol diacrylate, 1,6-hexanediol diacrylate, trimethylolpropane triacrylate, and pentaerythritol triacrylate). Difunctional and polyfunctional acrylate and methacrylate monomers described in U.S. Pat. No. 4,379,201 (Heilmann et al.), such as 1,2-ethanediol diacrylate, 1,12-dodecanediol diacrylate, pentaerythritol tetracrylate can also be used in the present invention. Difunctional and polyfunctional acrylates and methacrylates including acrylated epoxy oligomers, acrylated aliphatic urethane oligomers, acrylated polyether oligomers, and acrylated polyester oligomers, such as those commercially available from UCB Radcure Inc, Smyrna, Ga. under the Ebecryl tradename and those available from Sartomer, Exton, Pa., may also be employed.

Ethylenically unsaturated free radically polymerizable polysiloxanes, including especially the acrylated polysiloxane oligomers and polymers containing telechelic and/or pendant acrylate or methacrylate groups, are also examples of free radically polymerizable oligomers useful in the polymerizable compositions of the invention. These (meth) acrylated polysiloxane oligomers can be prepared by a variety of methods, generally through the reaction of chloro-, silanol-, aminoalkyl-, epoxyalkyl-, hydroxyalkyl-, vinyl-, or silicon hydride-functional polysiloxanes with a corresponding (meth)acrylate-functional capping agent. These preparations are reviewed in a chapter entitled "Photopolymerizable Silicone Monomers, Oligomers, and Resins" by A. F. Jacobine and S. T. Nakos in Radiation Curing Science and Technology (1992), Plenum: New York, pp. 200–214. Preferred acrylated polysiloxane oligomers include those acryl-modified polydimethylsiloxane resins commercially available from Goldschmidt under the "Tego RC" designation and those acrylamido-terminated monofunctional and difunctional polysiloxanes described in U.S. Pat. No. 5,091,483 (Mazurek et al.).

When a radiation activatable crosslinker is present in a coating material that is polymeric, as opposed to monomeric or oligomeric, preferred polymers have abstractable hydrogen atoms in the backbone and/or sidechains of the polymer in an amount sufficient to allow crosslinking of the polymer to a desired level upon exposure of the crosslinking agent/polymer composition to the monochromatic radiation source. As a general rule, hydrogen atoms are most easily abstracted from tertiary carbon atoms, allylic and benzylic groups, those hydrogens on carbon atoms in a position alpha to an oxygen or nitrogen atom (e.g., organic ethers and tertiary amines) and those carried by terminal or pendant mercapto groups.

The radiation crosslinkable polymer may be a thermoplastic polymer such as those selected from the group consisting of polyolefins, polystyrenes, vinyl plastics, polyacrylates, polymethacrylates, poly(vinyl esters), polyamides, polycarbonates, polyketones, or it may be a copolymer comprising the polymerization product of at least one of the monomers from which the foregoing polymers may be derived and a copolymerizable comonomer. Alternatively, the radiation crosslinkable polymer may be an elastomer such as those selected from the group consisting of polyurethanes, polydiorganosiloxanes, A-B-A-type block copolymers, synthetic rubber, natural rubber, ethylene-vinyl monomer polymers, poly(vinyl ethers), poly(vinyl esters), polyacrylates, polymethacrylates, or a copolymer comprising the polymerization product of at least one of the monomers from which the foregoing polymers may be derived and a copolymerizable comonomer. In any event, it is preferred that the radiation crosslinkable polymer (exclusive of the crosslinking agent) absorb substantially no radiation emitted by the monochromatic radiation source.

In accordance with one embodiment of the invention, a photoinitiator or suitable mixture of photoinitiators are chosen such that the initiator or initiator mixture exhibits an extinction coefficient greater than or equal to about 1000 $M^{-1}$ $cm^{-1}$ at the peak wavelength of the chosen monochromatic radiation source. Such a selection assures efficient use of radiation to cure the polymerizable composition to a well defined depth dependent on the photoinitiator concentration. Typically, these combinations of initiator and radiation source will efficiently polymerize the polymerizable composition to a depth of less than about 50 microns. While longer exposure times will allow deeper cure to be achieved, the efficiency is dramatically lowered. Alternatively, lower concentrations of initiator can be utilized with a given monochromatic light source allowing for deeper cure to be achieved but resulting in a reduction in cure speed and cure efficiency.

Suitable photoinitiators can be organic, organometallic, or inorganic compounds, but are most commonly organic in nature. Examples of commonly used organic photoinitiators include benzoin and its derivatives, benzil ketals, acetophenone, acetophenone derivatives, anthraquinones, anthraquinone derivatives, benzophenone, benzophenone derivatives, and triazine derivatives.

While molar absorptivities of the photoinitiator vary according to wavelength, it is preferred that the photoinitiator for a given monochromatic source be selected such that the molar absorptivity of the photoinitiator at the peak wavelength of the source be greater than about 1000 $M^{-1}$ $cm^{-1}$, preferably greater than about 5000 $M^{-1}$ $cm^{-1}$, and most preferably greater than about 10,000 $M^{-1}$ $cm^{-1}$. As an example, when a xenon chloride excimer lamp is selected as the monochromatic light source to polymerize a polymerizable composition, preferred photoinitiators include 2-methyl-1-[4-(methylthio)phenyl]-2-morpholinopropanone-1 with a molar absorptivity of about 18,000 $M^{-1}$ $cm^{-1}$, 2-benzyl-2-N,N-dimethylamino-1-(4-morpholinophenyl)-1 butanone with a molar absorptivity of about 16,000 $M^{-1}$ $cm^{-1}$, and 4,4'-bis(4-isopropylphenoxy) benzophenone with a molar absorptivity of about 10,000 $M^{-1}$ $cm^{-1}$ at 308 mn respectively.

The chosen initiator or mixture of initiators can be admixed with the ethylenically unsaturated free radically polymerizable monomer and/or oligomer blend to form a polymerizable composition. The photoinitiator or photoinitiator mixture is to be utilized in sufficient amount to provide the degree of polymerization desired in the final polymerized composition, that is to say in an "effective amount." The amount of photoinitiator is dependent on the molar absorptivity of the photoinitiator at the peak wavelength of the source and the thickness of the coating and should be selected such that at least two, preferably five, and most preferably ten percent of the total incident actinic radiation reaching the coating is absorbed by the photoinitiator within the coating. It will be understood that while a minimum absorption is required for efficiency, too great an absorption can result in a decrease in overall efficiency. Preferably, the amount of photoinitiator will be such that no more than ninety, preferably no more than eighty, and most preferably no more than seventy percent of the incident actinic radiation reaching the coating is absorbed by the photoinitiator within the coating. Generally, the initiator or initiator mixture will constitute from as low as about 0.001 to about 7 percent by weight of the polymerizable composition, preferably from about 0.01 to about 5 percent, and most preferably from about 0.1 to about 4 percent.

In another embodiment, the invention provides a low input power monochromatic source to cure a polymerizable composition comprising ethylenically unsaturated free radically polymerizable monomer and/or oligomer blends containing one or more photoinitiators. Sources requiring less than about 10, preferably less than about 5, and most preferably less than about 3 W/cm of bulb length are useful in such methods. Generally, the most useful commercially available low power light source is the low pressure mercury arc lamp (germicidal lamp) having a peak intensity radiation centered at about 254 nm because commercially available photoinitiators exist that activate readily at that wavelength. The use of a low powered radiation source, such as the germicidal lamp, as a photopolymerization energy source provides a highly energy efficient polymerization process when used with such photoinitiators; these sources generally emit far less unwanted radiation in the form of heat and are available commercially at low cost. Such lamps in such systems can also be sequentially banked, also at low cost and with little excess heat. These lamps, therefore, can be used to provide a narrow wavelength band of radiation that very efficiently interacts with a chosen photoinitiator in a manner that offers a low cost, energy efficient alternative to conventional methods of on web photopolymerization.

Similarly, a further embodiment uses a low power monochromatic light source to crosslink a radiation crosslinkable polymer. A preferred light source is a low pressure mercury arc lamp with its peak wavelength at 254 nm.

In addition to the radiation crosslinkable polymer, the compositions used in one aspect of the invention include a radiation activatable crosslinking agent of the copolymerizable or non-copolymerizable type, though the latter is preferred. In general, radiation activatable crosslinking agents useful in the invention are those which become hydrogen abstractors after absorbing light having a wavelength of about 230 to about 330 nm.

Copolymerizable radiation activatable crosslinking agents become randomly incorporated into the backbone of the radiation crosslinkable polymer during the polymerization of the polymer. As a result, the copolymerizable crosslinking agent should be compatible and miscible with the monomers from which the polymer is derived (i. e., there should be no gross phase separation upon mixing). Copolymerizable crosslinking agents tend to promote more efficient crosslinking than their non-copolymerizable counterparts and minimize concerns associated with volatility of the crosslinking agent.

Useful copolymerizable crosslinking agents include substituted anthraquinones, copolymerizable acetophenones, copolymerizable benzophenones, substituted triazines, and mixtures thereof. Copolymerizable crosslinking agents useful in the invention can be found in U.S. Pat. Nos. 4,737,559 (Kellen et al.); U.S. Pat. No. 5,073,611 (Boettcher et al.); U.S. Pat. No. 5,128,386 (Auchter et al.); U.S. Pat. No. 5,202,483 (Bott et al.); U.S. Pat. No. 5,248,805 (Boettcher et al.); U.S. Pat. No. 5,264,533 (Boettcher et al.); U.S. Pat. No. 5,294,688 (Auchter et al.); and U.S. Pat. No. 5,389,699 (Boettcher et al.). Preferred copolymerizable crosslinking agents are the acrylate-functional aromatic ketones disclosed in U.S. Pat. No. 4,737,559 (Kellen et al.), in particular 4-acryloxybenzophenone.

Non-copolymerizable radiation activatable crosslinking agents are either mixed with or reacted with the radiation crosslinkable polymer subsequent to polymerization of the polymer, or are mixed with the monomer(s) for the polymer prior to polymerization but, in this event, do not react with the monomer(s). Included within this class are multifunctional crosslinking agents and graftable crosslinking agents. One advantage associated with the use of non-copolymerizable crosslinking agents is that they are more versatile because they are added to the polymer subsequent to polymerization. In addition, the non-copolymerizable type need not be miscible, compatible or reactive with the monomers from which the polymer is derived.

Preferred non-copolymerizable crosslinking agents are anthraquinone, substituted anthraquinones, multi-functional acetophenones, multi-functional benzophenones, substituted triazines, and mixtures thereof. Specific examples of useful anthraquinone-type non-copolymerizable crosslinking agents include anthraquinone, t-butyl anthraquinone and 2-ethyl anthraquinone. Particularly preferred as non-copolymerizable radiation activatable crosslinking agents are multi-functional acetophenones and benzophenones having the following formula:

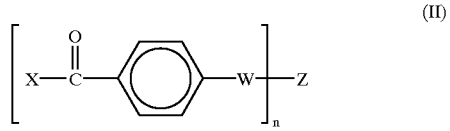

(II)

wherein:
X represents $CH_3$—; phenyl; or substituted-phenyl;
W represents —O—, —NH—, or —S—;
Z represents an organic spacer selected from the group consisting of aliphatic, aromatic, aralkyl, heteroaromatic, and cycloaliphatic groups free of esters, amides, ketones, urethanes, and also free of ethers, thiols, allylic groups, and benzylic groups with hydrogen atoms not intramolecularly accessible to the carbonyl group in Formula II; and n represents an integer of 2 or greater; preferably 2–6.

In one particularly preferred embodiment, X is phenyl; W is oxygen; Z is —(—$CH_2$—)$_{2-12}$—; and n is 2.

Specific examples of preferred multi-functional benzophenones include 1,5-bis(4-benzoylphenoxy)pentane,1,9-bis(4-benzoylphenoxy)nonane, and 1,11-bis(4-benzoylphenoxy)undecane.

Useful non-copolymerizable substituted triazine crosslinking agents also are described in U.S. Pat. Nos. 4,329,384 (Vesley et al.); 4,330,590 (Vesley); and 4,379,201 (Vesley). Specific examples of substituted triazine crosslinking agents include 2,4-bistrichloromethyl-6-(4-methoxyphenyl)s-triazine, 2,4-bistrichloromethyl-6-(3,4-dimethoxyphenyl)s-triazine, 2,4-bistrichloromethyl-6-(4-methylphenyl)-s-striazine, and 2,4-bistrichloromethyl-6-(phenyl)s-triazine.

The radiation activatable crosslinking agent is employed in an effective amount by which is meant an amount large enough to provide the desired ultimate properties. For example, in the context of manufacturing an adhesive an effective amount of crosslinking agent is an amount sufficient to crosslink the polymer so that it has adequate cohesive strength but not in an amount so large that the polymer becomes overcured. The actual amount of crosslinking agent used will vary depending on the application, the type of polymer, the type of crosslinking agent, the ease of hydrogen abstraction from the polymer, the reactivity of the radicals formed, the intensity and length of exposure of the composition to irradiation, the polymer's molecular weight, and the desired final properties of the material. Within these guidelines, the amount of crosslinking agent employed preferably is about 0.01 to 25 weight %, more preferably about 0.1 to 10 weight %, and most preferably about 0.1 to 1.0 weight %, based upon the total weight of the polymer.

When using monochromatic sources to polymerize a polymerizable composition or to crosslink a polymeric coating, it is advantageous to minimize competitive absorptions by species other than the radiation activatable species, including the free radically polymerizable monomer, oligomer, polymer, and optional adjuvants that may be present. For example, in a free radically polymerizable clear coat containing a free radical photoinitiator cured using germicidal lamps, it is advantageous to minimize the number of non-photoinitiator aromatic groups in the coating since aromatic groups have large molar absorptivities in the region of 254 nm, the wavelength emitted by the source, which will compete for the light provided by the source. It is preferred that any competing absorptions be such that they account for less than about 50 percent of the total absorbance through the coating. more preferably less than about 10 percent, and most preferably less than about 1 percent.

The radiation activatable compositions of the invention may be coated directly onto a substrate and cured upon exposure to the radiation source. Coatings may be applied to the substrate via any of a variety of conventional coating methods, such as from solvent or waterborne, but preferred methods are those commonly used for 100% solids coatings and include roll coating, knife coating, curtain coating, spray coating, hot melt coating, direct and offset gravure coating, die coating and any other coating method that may be of utility as is known to those skilled in the art. Generally the most useful coating methods will be those specifically adapted to deliver thin coatings, preferably through the use of precision roll coaters and electrospray methods, and the like, including those described in U.S. Patent Nos. 4,748,043 and 5,326,598 (both to Seaver et al.). When the viscosity of a coating formulation is not appropriate for a preferred coating method, the coating composition may be heated to lower its viscosity or it may advantageously be diluted with a low viscosity diluent which can be a reactive diluent such as a copolymerizable monomer or a nonreactive diluent which preferably is removed prior to curing the composition using conventional drying techniques.

The radiation activatable compositions may be applied to at least a portion of at least one major surface of a suitable flexible or rigid substrate or surface or backing and irradiated using the prescribed light sources. Useful flexible substrates include paper, plastic films such as poly (propylene), poly(ethylene), poly(vinyl chloride), poly(tetrafluoroethylene), polyester (e.g., poly(ethylene terephthalate)), polyamide film such as Kapton™ film available from DuPont, cellulose acetate, and ethyl cellulose. A particularly useful substrate is oriented or non-oriented polypropylene. Backings can also be of woven fabric formed of threads of synthetic fibers or blends of these, or nonwoven sheets. In addition, suitable backings include metal, metallized polymeric film, or ceramic sheet material. Further, suitable backings include substrates that are reflective or transparent and that are clear, colored, opaque, or printed upon. One of the advantages to the use of the light sources of the present invention is the ability to use such low heat sources with radiation polymerizable or crosslinkable coatings on heat sensitive substrates. Commonly used radiation sources often generate undesirable levels of thermal radiation that can distort or damage a variety of synthetic or natural flexible substrates. Suitable rigid substrates include but are not limited to glass, wood, metals, treated metals (such as those comprising automobile and marine surfaces), polymeric material and surfaces, and composite material such as fiber reinforced plastics. Suitable substrates may be used without any surface modification or they may be surface treated using any of a number of means well known to those skilled in the art, including corona treatment, flame treatment, chemical treatment, mechanical etching, exposure to ultraviolet light, and so on.

One particularly useful coating derived from the method of the present invention involves the polymerization of acrylated polysiloxanes on a variety of substrates to form release coatings under low oxygen atmosphere. The use of silicone release coatings has been an industry standard for many years and is widely employed by liner suppliers and large, integrated tape manufacturers. Release coatings prepared in this manner may exhibit any desired level of release, including (1) premium or easy release, (2) moderate or controlled release, or (3) tight release; premium release requires the least amount of force. Premium release coatings (i.e., those release coatings having aged release forces in the range of up to about 1.6 N/dm) typically are used in release liner applications. Premium release coatings are less useful, however, when coated on the back surface of pressure sensitive adhesive tapes, because their low release force can cause tape roll instability and handling problems. Such a release coating on the back surface of a pressure sensitive adhesive tape construction is often referred to as a "low adhesion backsize" (LAB). Release coatings having moderate to high levels of aged release (about 2 to about 35 N/dm) prove particularly useful when used as low adhesion backsizes.

Polymerizable polysiloxane compositions suitable for use in the invention to produce release coatings are commercially available from, for example, Goldschmidt Chemical Corporation under the TEGO name. These acrylated polysiloxane resins are pourable and may be blended for optimized properties such as level of release, adhesive compatibility, and substrate compatibility. An example of a blend that is recommended for achieving premium (easy) release is a 70:30 blend of Tego™ RC726 and Tego™ RC711.

In addition, polymerizable compositions containing acrylated polysiloxanes for use in the production of release coatings may include, as polymerizable constituents, 100% acrylated polysiloxanes or, alternatively may include free radically polymerizable diluents in addition to the acrylated polysiloxanes. Such non-polysiloxane free radically polymerizable diluents can be used to modify the release properties of the coatings of the present invention and also enhance the coating's mechanical properties and anchorage to backings or substrates used in pressure sensitive adhesive tape or release liner constructions. Depending upon the ultimate properties desired in the polymerized release coatings, useful non-polysiloxane free radically polymerizable diluents include the monofunctional, difunctional and polyfunctional acrylate, methacrylate and vinyl ester monomers and oligomers previously mentioned. Preferably, difunctional and polyfunctional acrylate and methacrylate monomers such as 1,4-butanediol diacrylate, 1,6-hexanediol diacrylate, trimethylolpropane diacrylate, pentaerythritol triacrylate, 1,2-ethanediol diacrylate, 1,12-dodecanediol diacrylate, trimethylolpropane triacrylate, pentaerythritol tetracrylate, pentaerthyritol pentaacrylate, and difunctional and polyfunctional acrylate and methacrylate oligomers including acrylated epoxy oligomers, acrylated aliphatic urethane oligomers, acrylated polyester oligomers, and acrylated polyethers such as those commercially available from UCB Radcure Inc. under the Ebecryl tradename and from Sartomer, Exton Pa., are employed. The monofunctional, difunctional, and polyfunctional acrylate, methacrylate and vinyl ester monomers and oligomers employed in these release coatings can be used at a concentration of from about 10 to about 99, preferably from about 25 to about 95 weight percent, based on the total weight of the release coating composition. Mixtures of monofunctional, difunctional and polyfunctional non-polysiloxane monomers and oligomers also can be used.

Exposure times needed to cure acrylated polysiloxanes depend on reactivity of the particular formulation being used, the intensity of the monochromatic source, and the molar absorptivity of the photoinitiator at the peak wavelength of the selected source. As the intensity of a given source decreases, longer exposure times are required. When monochromatic sources driven at input powers of 40 W/cm or greater are used, exposure times can be as short as 5 seconds, more preferably less than 1 second, and most preferably less than about 0.1 sec. Use of lamps driven at lower power of which a low pressure mercury arc lamp is typical, require longer exposure times. This conveniently can be achieved by using multiple lamps in an array like configuration.

A second particularly useful coating derived from the method of the present invention pertains to polymerization of multifunctional monomers, oligomers, or blends thereof to form hard coats. Such coatings are well known in the art and can impart abrasion resistance, scratch resistance, or mar resistance to the surface of a substrate. Preferred compositions include those multifunctional acrylate monomers, oligomers, and blends thereof described above and include such monomers as 1,4-butanediol diacrylate, 1,6-hexanediol diacrylate, trimethylolpropane diacrylate, pentaerythritol triacrylate, 1,2-ethanediol diacrylate, 1,12-dodecanediol diacrylate, trimethylolpropane triacrylate, pentaerythritol tetracrylate, and pentaerythritol pentaacrylate. Also preferred are monomers of even higher functionality such as those described by Wendling et al. in U.S. Pat. No. 4,262,072. Further benefit can be achieved by adding an adjuvant selected for its hardness such as a copolymerizable, surface functionalized ceramic particulate coating as described by Bilkadi in U.S. Pat. No. 4,885,332.

Crosslinking of pressure sensitive adhesive coatings also can be conveniently accomplished by use of the present method. Preferred crosslinking agents include multifunctional benzophenones and copolymerizable benzophenones such as acryloxybenzophenone.

The following examples are offered to aid in the understanding of the present invention and are not to be construed as limiting the scope thereof. Unless otherwise indicated, all parts and percentages are by weight

EXAMPLES

Test Methods

Loop Tack Tape Test:

A qualitative measure of cure was provided by contacting an approximately 10 cm strip of a Kraton™ (Shell, Houston, Tex.) adhesive coated tape having a polyurethane LAB so as to provide a silicone free adhesive surface. The adhesive was applied to the surface of the release coating being tested and removed three successive times in three different locations. The test tape was then folded back on itself bringing one adhesive surface in contact with another adhesive surface. If the silicone surface was adequately cured, the adhesive surfaces bonded together resulting in delamination of the adhesive from the tape backing when peeled apart. In the event of unacceptable silicone transfer, no bonding occurred between the adhesive surfaces.

Peel Adhesion and Readhesion:

A sample of release coated substrate is attached release side up using double stick tape to a standardized 0.79×1.97 cm steel plate. A Kraton based standard adhesive test tape is laminated to the release coating using a mechanical roller with an applied force of 2 kg. The test tape is then peeled from the release coated surface at 30.5 cm per minute and the 90° peel force recorded on an Instron™ tension and compression tester. Readhesion of the adhesive is measured after removal of the test tape from the silicone coated surface, applying the test tape to a second standardized surface with an application force of 100 grams, then recording the force necessary to remove the tape at a rate of 30.5 cm per minute.

Silicone Coat Weight:

Silicone coating weight was measured using an X-Ray Fluorescence Analyzer (Model LAB $X^{3000}$, Oxford Instruments, Abingdon, UK) (Direct readings were converted to actual coating weights (g/m$^2$) by applying a correction factor provided by the acrylated polysiloxane manufacturer to compensate for the varying amounts of silicon in the different formulations evaluated.

Silicone Transfer:

A Kraton™ (Shell Oil Company, Houston, Tex.) based adhesive test tape was laminated to the release coating prior to winding into roll form. The test tape used a nonsilicone LAB to eliminate any contact with a silicone surface prior to the test. After allowing the test tape to dwell in contact with the release coating for a minimum of one hour, the tape was removed and evaluated using Electron Spectroscopy for Chemical Analysis (ESCA) using a takeoff angle of 40°. The intensity of the silicon ESCA signal was then measured. The value for a well cured release coating was less than 5 atomic weight percent silicon on the adhesive surface.

Delta Haze:

A 9.8 by 9.8 cm section was removed from the coated substrate to be tested and attached to a 0.32 cm thick glass plate using a standard adhesive tape. Haze was measured at four locations on the sample using a Colorimeter (Model XL-385, BYK Gardner, Silver Springs, Md.) and the average reported as an initial haze value. The samples were then mounted, coated side up, on a Taber Abraser (Model 5150, Taber Industries, North Tonawanda, N.Y.) where they were abraded using CS-10F wheels for 50 cycles with a 500 gram load. One cycle equaled one complete revolution of the sample. Haze was then remeasured as above and the difference between initial and final haze reported as a delta haze.

Gel Test:

A 3.2 by 3.2 cm square of an adhesive coated article was weighed, placed in a screen basket, then immersed in a suitable solvent for a period of 24 hours. The basket was then removed and excess solvent allowed to escape. through the screen. Residual gel was retained. The basket containing the substrate and remaining gel was then dried for 2 hours at 60° C. and reweighed. The amount of insoluble adhesive remaining in the basket was reported as a percent of the initial adhesive coating present on the sample.

Example 1

This Example describes formation of a polysiloxane release coat cured using a bank of low pressure mercury arc lamps.

A 70:30 blend of Tego™ RC726 (Goldschmidt) and Tego™ RC711 containing 2 percent Darocur 1173 (Ciba) was coated onto a corona treated cast polypropylene substrate using a manual coater (Euclid Tool and Die, Bay City, Mich.). The coating weight was estimated to be about 1 g/m$^2$. The coated substrate was then taped to an aluminum carrier tray and passed under the output from a bank of five germicidal lamps (Model G15T8, Osram Sylvania, Danvers, Mass.) mounted in the nitrogen inertable portion of a conveyorized belt processor at a speed of 15.2 meters per minute. Oxygen levels were maintained below 50 ppm as measured using an oxygen analyzer (Model FAH0500S, Delta F Corp., Woburn, Mass.). The average intensity of the radiation and the dose provided were measured to be 0.7 mW/cm$^2$ and 1.75 mJ/cm$^2$, respectively, using a Uvimap™ Model UM254L-S (Electronic Instrumentation and Technologies, Sterling, Va.). The coating was dry and cured in accordance with the above-described Loop Tack Tape test. A peel force of 0.5 N/dm was measured.

Example 2

This Example describes preparation of a coating having medium release properties.

The method of Example 1 was repeated using a 45:55 blend of Tego™ RC706 and RC711 containing 2 percent Darocur™ 1173. Again, the coating came out of the processor dry and cured in accordance with the Loop Tack Tape test. The peel adhesion was measured to be 2 N/dm.

Example 3

This Example describes curing a tight release formulation comprising a blend of acrylated polysiloxanes with a non-silicone acrylate cured using a xenon chloride excimer lamp.

A coating of 10 parts Tego™ RC711 and 90 parts of a polyethylene glycol (400) diacrylate (SR 344, Sartomer Corp.) containing 5 percent Irgacure™ 907 (Ciba) was coated onto a corona flame treated biaxially oriented polypropylene ("BOPP") film using the method of Example 1. The coated substrate was passed under a xenon chloride excimer lamp (Model 308, Heraeus, Hanau, Germany) at a speed of 25 meters per minute using the nitrogen inerted processor of Example 1. The source intensity and dose were measured to be 28.7 mW/cm$^2$ and 10.0 mJ/cm$^2$, respectively, using a Uvimap™ (Model UM313H-S, EIT). The coating was dry to the touch and demonstrated a peel adhesion of 14.6 N/dm.

Example 4

The Example describes use of a transparent top sheet to eliminate the need for nitrogen purging.

The method of Example 2 was repeated using a flame treated BOPP film having about 85 percent transmission at 254 nm as a cover sheet. No nitrogen inerting was used. The cured coating demonstrated some liner confusion when the substrate and the top sheet were delaminated but clearly indicated that a top sheet can provide a sufficient barrier to oxygen to allow cure to occur and that the coatings can be cured via backside irradiation, i.e., exposure through a backing Example 5

This Example describes the continuous high speed cure of an acrylated polysiloxane release coating using an excimer lamp.

A 45:55 blend of Tego™ RC726 and RC711 containing 2 percent Irgacure™ 907 was coated continuously onto a corona treated cast polypropylene web using offset gravure coating. The web was passed through a nitrogen inerted cure chamber having less than 50 ppm oxygen at 450 meters per minute where it was exposed to the output of a xenon chloride excimer lamp (Heraeus) operating at full power. A quartz plate provided a window between the lamp and the inerted portion of the chamber. The cured release coatings were tested for peel adhesion and readhesion after 24 hour and 1 week aging at 120° C. and at 120° C. and 90% relative humidity. Test data using Scotch™ (3M Company, St. Paul, Minn.) 810 Magic Tape are shown in Table 1. Readhesions were measured to glass.

TABLE 1

| Conditions | Adhesion (N/dm) | | Readhesion (N/dm) | |
| --- | --- | --- | --- | --- |
| | 24 hours | 1 week | 24 hours | 1 week |
| 25° C. | 0.20 | 0.29 | 22.8 | 30.0 |
| 120° C. | 0.39 | 0.43 | — | 27.5 |
| 120° C., 90% RH | 0.13 | 0.43 | — | 17.8 |
| control | — | — | 30.0 | — |

Examples 6–8

These Examples demonstrate low silicone transfer to the adhesive of an adhesive coated article in which the LAB provides tight release and is an acrylated polysiloxane coating cured using a plurality of low pressure mercury arc lamps.

A coating comprising 45 parts of Tego™ RC706 and 55 parts Tego™ RC711 varying amounts of Darocur™ 1173 as photoinitiator was applied to one side of a cast polypropylene substrate using a five roll coater. A coating weight of 0.7 g/m$^2$ was chosen. Coatings were cured at 36.6 meters per minute using a total of 18 G15T8 lamps giving a dose of 2.0 mJ/cm$^2$. A tackified Kraton™ adhesive was hot melt coated inline onto the opposite side and the construction wound into a roll. After allowing a dwell time of several days, samples were removed from the roll and ESCA measurements made on the adhesive surface. Date are shown in Table 2

TABLE 2

| Example | Darocur ™ 1173 Conc. (%) | Peel Adhesion (N/dm) | Atomic Weight (% Si) |
| --- | --- | --- | --- |
| 6 | 1 | 5.83 | 3.9 |
| 7 | 2 | 6.46 | 2.7 |
| 8 | 3 | 6.99 | 3.4 |

Examples 9–11

These Examples demonstrate low silicone transfer to the adhesive of an adhesive coated article in which the LAB provides release and is an acrylated polysiloxane coating cured using a plurality of low pressure mercury arc lamps.

An coating comprising 17.5 parts of Tego™ RC726, 35 parts of Tego™ RC706, and 47.5 parts Tego™ RC711 with 3 percent Darocur™ 1173 as photoinitiator was applied to one side of a cast polypropylene substrate using a five roll coater. A coating weight of 0.7 g/m$^2$ was chosen. Coatings were at 36.6 meters per minute using three different light levels provided by 6, 18, or 30 G15T8 low pressure mercury arc lamps. A tackfied Kraton™ adhesive was hot melt coated inline onto the opposite side and the construction wound into a roll. After allowing a dwell time of several days, samples were removed from the roll and ESCA measurements made on the adhesive surface. Data are shown in Table 3.

TABLE 3

| Example | Dose (mJ/cm$^2$) | Peel Adhesion (N/dm) | Atomic Weight (% Si) |
| --- | --- | --- | --- |
| 9 | 0.7 | 1.15 | 4.3 |
| 10 | 2.0 | 1.34 | 3.9 |
| 11 | 3.7 | 1.44 | 3.1 |

Examples 12–19

These Examples describe the continuous high speed cure of an acrylated polysiloxane coating using an array of low pressure mercury arc lamps.

A 70:30 blend of Tego™ RC715 (Goldschmidt) and RC711 containing two percent Darocur™ 1173 was coated continuously onto a smooth corona treated BOPP film using the coating method of Example 5. The coated film was passed through a nitrogen inerted cure chamber having an oxygen content of less than 50 ppm. A transparent polyethylene film (transmission at 254 nm>82 percent) isolated the moving web from a three meter long bank of 69 G15T8 germicidal lamps spanning across the web. Varying web speeds were run with the results shown in Table 4.

TABLE 4

| Example | Line Speed (m/min) | Readhesion (N/dm) |
| --- | --- | --- |
| 12 | 30 | 6.9 |
| 13 | 60 | 7.3 |
| 14 | 90 | 7.2 |
| 15 | 120 | 6.7 |
| 16 | 150 | 7.3 |
| 17 | 180 | 7.0 |
| 18 | 210 | 6.7 |
| 19 | 240 | 6.7 |

Example 20

This Example describes continuous preparation of a pressure sensitive adhesive tape in which the LAB is cured.

A 45:55 blend of Tego™ RC706 and RC711 containing two percent Darocur™ 1173 was coated onto a corona treated textured polypropylene web at a coating weight of 0.7 g/m$^2$ using a five roll coater. The wet coating was cured at 36.6 meters per minute in a nitrogen inerted cure chamber by exposing to a one meter long bank of 24 low pressure mercury arc lamps (Model G25T8, Osram Sylvania). The average intensity was 4.04 mW/cm$^2$ and the dose provided was 6.7 mJ/cm$^2$. A hot melt coatable adhesive was coated onto the uncoated side and the web wound into a continuous roll.

Examples 21–25

These Examples describe use of the present invention to prepare release liners. Data also indicate the performance of the cured coatings upon aging.

Various blends of RC901 (Goldschmidt) and RC711 containing two percent Darocur™ 1173 were coated using the method of Example 1 onto PE-PP copolymer sheets cut from a film that had been corona treated to give a surface energy of 36–38 dynes/cm$^2$. The coated substrates were then passed under a bank of 8 G15T8 bulbs at a speed of 15.2 meters per minute then laminated to a standard adhesive coated article. Data on the cured coatings before and after aging are shown in Table 5.

TABLE 5

| Example | RC901 (%) | RC711 (%) | Peel Force (N/dm) Unaged | Peel Force (N/dm) 1 week at 150° F. |
|---|---|---|---|---|
| 21 | 100 | 0 | 0.38 | 1.02 |
| 22 | 80 | 20 | 0.45 | 1.02 |
| 23 | 60 | 40 | 0.55 | 1.03 |
| 24 | 40 | 60 | 0.56 | 1.70 |
| 25 | 20 | 80 | 1.09 | 2.67 |

Example 26

This Example describes cure of a multifunctional acrylate resin using a xenon chloride excimer lamp in the absence of added heat and serves to show the benefit to added heat when polymerizing to give a hard coating.

A 30 percent solids MEK solution of hydantoin hexacrylate (as described in U.S. Pat. No. 4,262,072) containing four percent phr Irgacure™ 907 was applied to a black polyester substrate at 30.4 meters per minute and dried to give a dry coating weight of 25.8 g/m$^2$. The tacky coating was then exposed to the output from a xenon chloride excimer lamp (Heraeus) at a speed of 15.2 meters per minute in a nitrogen inerted chamber. The final coating was dry to the touch and a delta haze greater than 6.

Example 27

This Example describes the effect of added heat on the cure of a multifunctional acrylate resin using a xenon chloride excimer lamp.

Example 27 was repeated using a radiant IR heater to preheat the coating to a temperature of 65.6° C. at the entrance slit of the cure chamber. The cured coating was dry to the touch, adherent, and gave a delta haze of less than 3 percent.

Example 28

This Example describes use of an array of low pressure mercury arc lamps to cure a multifunctional acrylate to form a hard coat.

A 19 percent solids MEK solution of hydantoin hexacrylate containing 4 percent phr Irgacure™ 184 was coated onto a dyed, semitransparent black polyester film and dried to give a dry coating weight of 25.8 g/m$^2$. The coated film was then cured at 33.5 meters per minute under a bank of 24 G25T8 low pressure mercury arc lamps with an irradiance of 2.7 mW/cm$^2$ and a total dose of 5.9 mJ/cm$^2$. The oxygen content in the chamber was 12 ppm. The delta haze was measured to be 4.1 percent.

Example 29

This Example demonstrates the effect of heat when used with low pressure mercury arc lamps to cure hard coat compositions.

Example 28 was repeated using a 9.2 percent solids solution. The coated film having a dry resin weight of 14.8 g/m$^2$ was passed over an electrically heated roller to bring the web temperature to 66.7° C. prior to entering the inerted cure chamber. Oxygen levels within the cure chamber were maintained between 20 and 40 ppm by using a nitrogen gas purge preheated to an elevated temperature to bring the ambient environment within the cure chamber to a temperature of 62.2° C. The coating was cured at a speed of 36.6 meters per minute with an irradiance of 4.1 mW/cm$^2$ and a dose of 8.2 mJ/cm$^2$. Delta haze was 2.1 percent.

Example 30

This Example describes use of a free radically polymerizable formulation containing a copolymerizable ceramic particulate to form a hard coat.

A 46 percent solids solution in 94:6 i-propyl alcohol/water of a copolymerizable, surface functionalized ceramic particulate coating (described in U.S. Pat. No. 4,885,332) containing 4 percent phr Irgacure™ 184 was coated and dried onto a dyed, semitransparent black polyester film at a dry coating weight of 25.2 g/m$^2$. The tacky coating was cured as in Example 30 at a speed of 40.2 meters per minute at an irradiance of 2.7 mW/cm$^2$ and a dose of 3.7 mJ/cm$^2$. The delta haze of the cured hard coat was 3.0 percent.

Example 31

This Example shows the effect of changing line speeds on the coating of Example 30.

Example 30 was repreated but at a line speed of 32.9 meters per minute. The measured delta haze was 2.3 percent.

Examples 32≧35

These Examples describe use of a medium pressure mercury arc lamp to crosslink a hot melt coatable adhesive containing acryloxybenzophenone.

A hot melt coatable acrylic adhesive containing 0.1% acryloxybenzophenone was coated onto a paper carrier web and exposed to a micorwave driven medium pressure mercury arc lamp (Model F300, Fusion UV Systems, Gaithersburg, Md.). The gels at several UVC (250–260 nm) dosages after 24 hours in ethyl acetate as measured by a Power Puck (EIT) are reported in Table 6. Significant UVA (320–390 nm), UVB (320–380 nm), and heat are provided by the source in addition to the UVC radiation.

TABLE 6

| Example | UVC Dose (mJ/cm$^2$) | Percent Gel |
|---|---|---|
| 32 | 17 | 60.16 |
| 33 | 34 | 66.97 |
| 34 | 68 | 74.97 |
| 35 | 136 | 77.63 |

Examples 36–39

These Examples describe use of a low pressure mercury arc lamps to crosslink a hot melt coatable adhesive containing acryloxybenzophenone.

The method of Examples 32–35 was repeated using a bank of 9 low pressure mercury arc lamps. Line speeds were adjusted to allow comparable UVC doses to those of Examples 32–35 to be provided. The gel results and UVC dosages are listed in Table 7. The data show that identical percent gels can be obtained. The amount of UVA, UVB, and heat provided are negligible.

TABLE 7

| Example | UVC Dose (mJ/cm$^2$) | Percent Gel |
|---------|----------------------|-------------|
| 36 | 17 | 55.75 |
| 37 | 34 | 56.60 |
| 38 | 68 | 73.17 |
| 40 | 136 | 76.47 |

Various modifications and alterations of this invention will be apparent to those skilled in the art without departing from the scope and spirit of this invention, and it should be understood that this invention is not limited to the illustrative embodiments set forth herein.

We claim:

1. A process for crosslinking a polymeric coating comprising:
   (a) providing a moving substrate coated on at least a portion thereof with a crosslinkable composition comprising: (i) a radiation crosslinkable polymer containing abstractable hydrogen atoms, and (ii) a radiation activatable crosslinking agent;
   (b) providing a source of essentially monochromatic radiation comprising one or more lamps where each lamp has an input power of less than about 10 W/cm and having a wavelength sufficient to activate the crosslinking agent and to crosslink the polymer; and
   (c) exposing the radiation crosslinkable composition to the radiation emitted by the monochromatic source for a time sufficient to crosslink the polymer.

2. The process of claim 1 wherein said radiation crosslinkable polymer is a thermoplastic polymer selected from the group consisting of polyolefins, polystyrenes, vinyl plastics, polyacrylates, polymethacrylates, poly(vinyl esters), polyamides, polycarbonates, polyketones, and copolymers comprising the polymerization product of at least one of the monomers from which the foregoing polymers may be derived and a copolymerizable comonomer.

3. The process of claim 1 wherein said radiation crosslinkable polymer is an elastomer selected from the group consisting of polyurethanes, polydiorganosiloxanes, block copolymers, synthetic rubber, natural rubber, ethylene-vinyl monomer polymers, poly(vinyl ethers), poly(vinyl esters), polyacrylates, polymethacrylates, and copolymers comprising the polymerization product of at least one of the monomers from which the foregoing polymers may be derived and a copolymerizable comonomer.

4. The process of claim 1 wherein said radiation activatable crosslinking agent is co-polymerizable.

5. The process of claim 1 wherein said radiation activatable crosslinking agent is selected from the group consisting of: substituted anthraquinones, copolymerizable acetophenones, copolymerizable benzophenones, and substituted triazines.

6. The process of claim 1 wherein said radiation activatable crosslinking agent is non-copolymerizable.

7. The process of claim 1 wherein the photoinitiator is selected from the group consisting of: 1,5-bis(4-benzoylphenoxy)pentane, 1,9-bis(4-benzoylphenoxy)nonane, and 1,11-bis(4-benzoylphenoxy)undecane.

8. The process of claim 1 wherein said radiation activatable crosslinking agent is selected from the group consisting of: anthraquinone, substituted anthraquinones, multi-functional acetophenones, multi-functional benzophenones, substituted triazines, and mixtures thereof.

9. The process of claim 1 wherein said radiation activatable crosslinking agent is selected according to the formula:

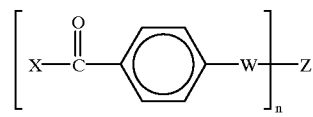

wherein:

X represents CH$_3$—; phenyl; or substituted-phenyl;

W represents —O—, —NH—, or —S—;

Z represents an organic spacer selected from the group consisting of aliphatic, aromatic, aralkyl, heteroaromatic, and cycloaliphatic groups free of esters, amides, ketones, urethanes, and also free of ethers, thiols, allylic groups, and benzylic groups with hydrogen atoms not intramolecularly accessible to the depicted carbonyl group; and n represents an integer of 2 or greater.

10. The process of claim 1 wherein said substrate comprises a biaxially oriented polypropylene film.

11. The process of claim 1 wherein the wavelength is in the range of 170 to 600 nm.

12. The process of claim 1 wherein the wavelength is in the range of 240 to 600 nm.

* * * * *

UNITED STATES PATENT AND TRADEMARK OFFICE
CERTIFICATE OF CORRECTION

PATENT NO. : 6,517,910 B2
DATED : February 11, 2003
INVENTOR(S) : Robin E. Wright It is certified that error appears in the above-identified patent and that said Letters Patent is hereby corrected as shown below:

Title page,
Item [56], References Cited, OTHER PUBLICATIONS, "Yamashita, H., et al," reference, "Photopolymerization of UV-curable Coatings," should read
-- *Photopolymerization of UV-curable Coatings,* --; and "Allen, Norman S. et al.," reference, "Photochemistry and photopolymerization activites of novel phenylthiobenzophenone and diphenylthiophene photointiators" should read
-- *Photochemistry and photopolymerization activites of novel phenylthiobenzophenone and diphenylthiophene photoinitiators* --

Column 2,
Line 35, commas omitted in a series; insert -- , -- following "monomer" and "oligomer"

Column 5,
Line 35, "isobomyl" should read -- isobornyl --

Column 13,
Line 3, insert -- . -- after "weight"

Column 14,
Line 5, delete "." following "escape"

Column 16,
Line 3, "An" should be -- A --

Column 18,
Line 35, delete "Examples 32 ≥ 35" and insert -- Examples 32-35 --

Signed and Sealed this

Second Day of December, 2003

JAMES E. ROGAN
*Director of the United States Patent and Trademark Office*